United States Patent

[11] 3,604,858

[72] Inventor Toshio Doi
Hamatmatsu, Japan

[21] Appl. No. 822,620
[22] Filed May 7, 1969
[45] Patented Sept. 14, 1971
[73] Assignee Victor Company of Japan, Limited
Yokohama, Japan
[32] Priority May 9, 1968
[33] Japan
[31] 43/30,518

[54] SIGNAL EDITING SYSTEM FOR HIGH FREQUENCY SIGNAL MAGNETIC RECORDING AND REPRODUCING APPARATUS

7 Claims, 10 Drawing Figs.

[52] U.S. Cl. .......... 179/100.2B, 178/6.6 A
[51] Int. Cl. .......... G11b 27/08, H04n 5/78
[50] Field of Search .......... 179/100.2 B; 178/6.6 A

[56] References Cited

UNITED STATES PATENTS 3,436,489 4/1969 Bounsall .......... 179/100.2
3,506,793 4/1970 Inoue .......... 178/6.6

*Primary Examiner*—Bernard Konick
*Assistant Examiner*—Howard W. Britton
*Attorney*—Louis Bernat

ABSTRACT: The invention provides a signal editing system for magnetic recording and reproducing apparatus which record on magnetic tape or other storage medium. The recorded signal includes a carrier wave which is frequency-modulated by video signals or other wide-band signals. This signal editing system is useful in recording a second signal on the magnetic medium on which a first signal is already recorded. The second signal is recorded on the magnetic track of the first signal on the magnetic medium, beginning at a suitable point on the magnetic track. The carrier wave components and the upper side band components of the second frequency-modulated signal are recorded at a predetermined higher than normal signal level only during the period the two signals are recorded, one superimposed over the other. The lower side band components of the second frequency-modulated signal are recorded at a signal level which is gradually lowered from said predetermined level with lowering of frequencies.

The system markedly reduces distracting editing marks which generally occur as a result of superimposed recording of two signals. It also reproduces recorded video signals at a high fidelity.

INVENTOR
TOSHIO DOI

BY Louis Bernat

ATTORNEY

INVENTOR
TOSHIO OOI

BY Louis Bernat
ATTORNEY

INVENTOR
TOSHIO DOI

BY Louis Bernat
ATTORNEY

INVENTOR
TOSHIO DOI

BY Louis Bernat

ATTORNEY

SIGNAL EDITING SYSTEM FOR HIGH FREQUENCY SIGNAL MAGNETIC RECORDING AND REPRODUCING APPARATUS

This invention relates to a signal editing system for an information recorder, and more particularly, to a signal editing system which is specially useful for recording and reproducing video band signals, such as video signals on magnetic tape.

Previously constructed helical scan, video magnetic tape recorder, have a fixed erasing head and a rotary recording heads separated by a distance ranging from fraction of an inch to several inches. These heads are simultaneously energized and deenergized at the beginning and the end of a recording period when a new signal is being added to or edited on a previously recorded tape. Editing marks, at the beginning of the newly recorded portion, are generated because the old signal is not erased at the point on the tape where the beginning of the new signal is recorded, thereby causing a "-beat signal" resulting from the recording of two signals on the same portion of the tape. Editing marks also appear at the end of the newly recorded portion because a segment of the old signal is erased after the end of the new signal portion, and no new signal is recorded on that segment. These editing marks generate visual distractions when the signals are reproduced and, therefore, lower the quality of the tape recording.

An improvement has be proposed to reduce the editing marks in magnitude to a level which does not cause distraction, as shown in our U.S. Pat. application, Ser. No. 594,760, filed Nov. 16, 1966, abandoned Dec. 16, 1969.

In that application, an editing system is described which delays the time at which the recording heads are energized or deenergized after the time when the erasing head is energized or deenergized. With that system, the recording of a new signal does not begin until the erased portion of the magnetic tape reaches the first point of contact between the recording head guide drum and the tape. At the end of the newly edited portion, the deenergization of the recording head is delayed until the last portion of the tape erased by the erasing head reaches the last point of contact between the drum and the tape. The results obtained are excellent in most applications. However, if it is necessary to begin the recording of a newly edited portion without any delay, that editing system cannot be used.

Another improvement has also been proposed to eliminate the distracting effects of a "beat signal" editing marks as described in our copending application, Ser. No. 614,933, filed Feb. 9, 1967, now U.S. Pat. No. 3,506,793, issued Apr. 14, 1970.

In that application, the distracting effects are reduced or eliminated by use of a bilevel signal amplifier for amplifying a signal to be recorded. The bilevel signal amplifier amplifies only those portions of a new signal segment which are recorded over an existing signal on a prerecorded tape, at a signal level which is higher than the remaining portions of the new signal segment recorded on erased tape.

This system can effectively reduce distracting effects. However, the signal level at which the portions of a new signal segment is recorded over the existing signal on a pre-recorded tape are amplified and maintained substantially constant with respect to all the frequency components contained in the signal. The higher frequency components of the video signal reproduced from these portions of the new signal segment are more pronounced than the lower frequency components, as compared with the original signal segment. It has been found that this causes an inversion of the reproduced images in extreme cases.

Accordingly, a principal object of the present invention is to provide a magnetic recording editing system which eliminates distracting editing marks resulting from superimposed recording of two signals on magnetic tape or other storage medium and also to provides a reproduced signal which is true to the original signal.

Another object of the invention is to provide a magnetic recording editing system which is simple in construction, having only a few component parts, being low in cost, and yet provides excellent reproduced pictures by eliminating the aforesaid distracting editing marks.

According to the invention, a signal editing system is provided for magnetic recording and reproducing apparatus which prerecorded on magnetic tape or other storage medium. Frequency-modulated signals are used in which the carrier wave is frequency-modulated by video signals or other wide-band signals. These signals reproduce the frequency-modulated signals from storage medium. The system is characterized by a second frequency-modulated signal recorded on a magnetic track of a first frequency-modulated signal on the magnetic medium, starting at a suitable point on the magnetic track. The carrier wave components and the upper side band components of the second frequency-modulated signal are recorded at a predetermined higher than normal signal level but only during the period the two signals are recorded with one superimposed over the other. The lower side band components of the second frequency-modulated signal are recorded at a signal level which is gradually lowered than the predetermined signal level, with a lowering of frequencies.

A characterizing feature of the present invention is that distracting effects resulting from superimposed recording of two signals are eliminated. The video signal reproduced from the superimposed recording portion on the magnetic medium has a frequency spectrum which is true to that of the original recorded signal.

The signal, editing system according to this invention, comprises, in its signal transmission system, a transistor amplifier, gating pulse producing means having a duration corresponding to the superimposed recording period of the two signals, and means for shunting (by capacitors) a part of the collector load and emitter load of the transistor amplifier, upon receipt of a gating pulse from the gating pulse producing means. It will be appreciated that, by suitably selecting the electrostatic capacity values of these capacitors, it is possible to increase the voltage gain of the transistor amplifier for the duration of the gating pulse. Also, the voltage gain of the carrier wave components and the upper side band components of the frequency-modulated input signal are increased over the voltage gain of the lower side band components thereof.

Another characterizing feature of the present invention lies in providing a reproduced video signal, which is true to the recorded signal by means of a circuit of simple construction.

This invention contemplates other objects, features and advantages which will become more fully apparent from the following detailed description taken in conjunction with the accompanying drawings which illustrate a preferred embodiment and in which.

Figure 1:
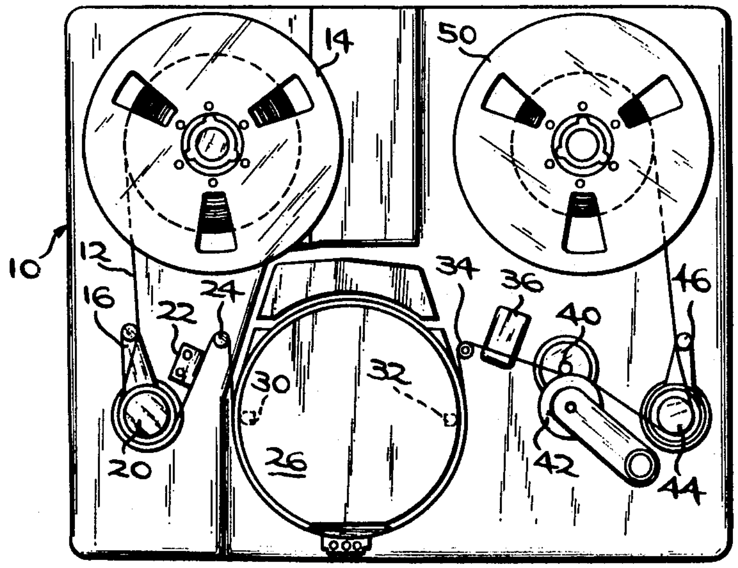
FIG. 1 is a top view of a helical scan type video magnetic tape recorder incorporating an editing system of this invention.
Figure 2A:
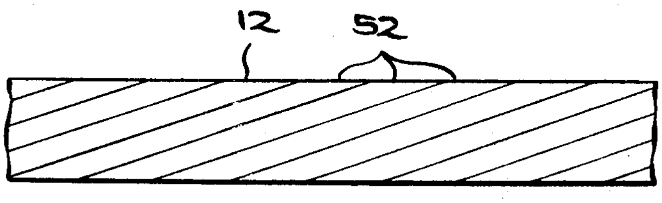
FIGS. 2A and 2B are diagrams of the tracks recorded on magnetic tape by the recorder of FIG. 1.

FIG. 1 illustrates a video magnetic tape recorder 10 incorporating an embodiment of the invention. A magnetic tape 12 stored on a reel 14 is drawn through a path around a tension arm 16, a guide roller 20, a magnetic erasing head 22, a guide roller 24, a guide drum 26 having rotary magnetic heads 30 and 32 for recording and reproducing a video signal, a guide roller 34, control and audio signal recording head 36, capstan 40, pinch roller 42, guide roller 44 and tension arm 46 to reel 50. The longitudinal axis of the tape 12 is transverse to the locus of the gaps of the heads 30 and 32. Thus, oblique tracks 52 are recorded on the tape as diagrammatically shown as FIG. 2A. The erasing head 22 is orthogonally oriented with respect to the longitudinal axis of the tape so that it erases rectangular portions of the tape bounded by lines parallel to line 54, which is perpendicular to the longitudinal axis of the tape. Similarly, the recording axis of the head 36 is perpendicular to the longitudinal axis of the tape.

Figure 2B:
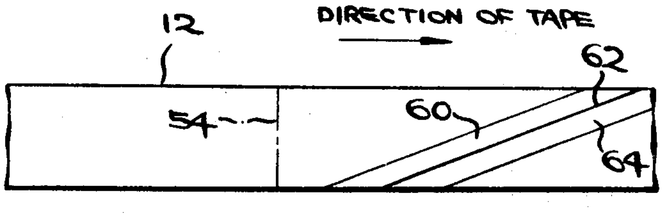

FIG. 2B, shows helical scan recorders in which simultaneously energized rotary magnetic recording heads are used. Only the portion of the tape left of the line 54 is erased, while the new signal is recorded starting with track 60 adjacent to line 62. The trapezoidal portion of the tape, bounded by the edges of the tape and lines 54 and 62, contains the new signal recorded over the old signal. When this tape is relayed, the information contained within the trapezoidal portion is reproduced as a distracting beat signal or editing mark.

At the end of the new signal portion, the erasing and the rotary recording heads are deenergized simultaneously. A trailing edge trapezoid portion bounded by lines 54 and 62 is formed in which no signal is recorded, causing another editing mark. The trapezoidal blank portion is formed because the last scan of the new signal is recorded on track 64, whereas the tape has been erased in the rectangle extending to the right from line 54.

In our copending application, Ser. No. 594,760, filed Nov. 16, 1966, now abandoned, an editing system is described which delays the time at which the recording heads are energized or deenergized, measured from the time that the erasing head is energized or deenergized. With that system, the recording of a new segment does not begin until the erased portion of the magnetic tape comes in contact with the recording head guide drum 26. At the end of newly recorded segment, the deenergization of the recording head is delayed until the last portion of the tape erased by erasing head 22 reaches the last point of contact between the drum 26 and the tape 12 near guide roller 34. The results obtained are excellent in most applications. However, where it is necessary to begin the recording of a new segment without any delay, that editing system cannot be used.

In our aforementioned application, Ser. No. 614,933, filed Feb. 9, 1967, now U.S. Pat. No. 3,506,793, another editing system is described. In that application the effect of the beat signal can be minimized if one of the two signals which are recorded on the same portion of the tape is at a much higher level than the other. The recording levels of all frequency components included in the new signal are approximately uniformly increased from 1 to 6 decibels higher than normal, as shown by the straight line 76 in FIG. 6. The new signal is recorded directly over the old signal and then it is decreased to the normal level, as shown as the straight line 77 in FIG. 6, when the erased portion of the tape reaches the recording head.

Figure 4:
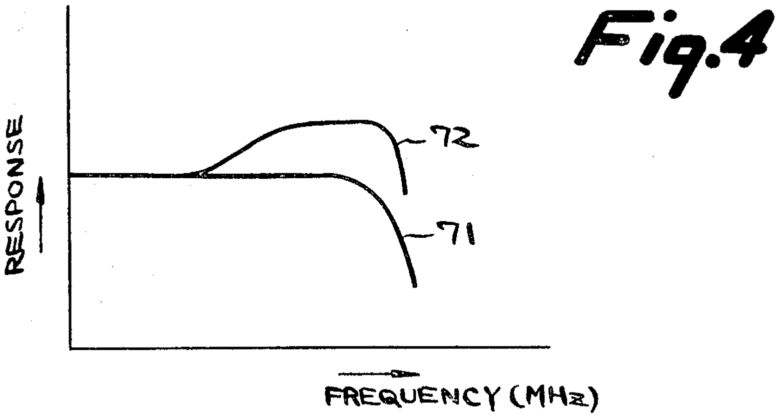
FIG. 4 are graphs of reproduced and demodulated video signals according to a prior art and this invention respectively.

It has been found that the reproduced and demodulated video signals obtained from signals recorded on the magnetic tape in this way have a defect which is described hereunder. Assuming that the frequency spectrum of the original video signal recorded has frequency components of equal magnitude as shown by the curve 71 in FIG. 4, the higher frequency components are more highest than the lower frequency components in the reproduced video signal. The frequency spectrum of the reproduced video signal is as shown by the curve 72. This causes an inversion of the reproduced images in extreme cases. The reasons for this phenomenon will be explained below.

Figure 5:
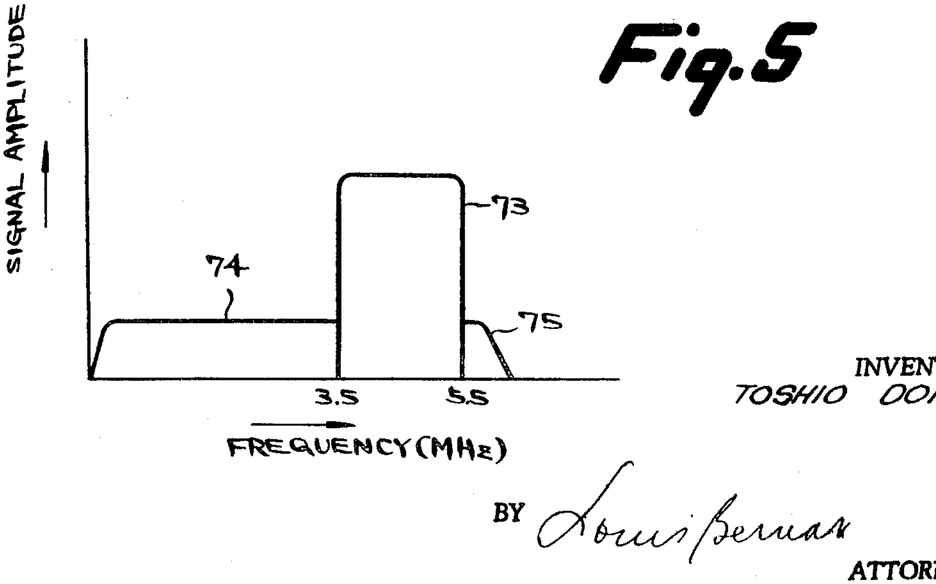
FIG. 5 is a frequency spectrum of frequency-modulated signal in which a carrier wave is modulated with video signal to be recorded on magnetic tape in the video tape recorder of FIG. 1.

Generally, when signals having a wide band frequency components, such as video signals, are recorded on a magnetic medium and reproduced therefrom, frequency-modulation means is usually used. In this case, the carrier wave is frequency-modulated by a video signal to be recorded which includes a DC component. The lowermost frequency of the frequency-modulated carrier wave is at least equal to the highest frequency of the video signal to be recorded. The uppermost frequency of the frequency-modulated carrier wave is near the highest frequency that can be recorded on the magnetic medium. Accordingly, the frequency spectrum of the frequency-modulated signal is such that the portion 73 (3.5 to 5.5 MHz.), at which the carrier wave is subjected to frequency-deviation, has a larger amplitude as shown in FIG. 5, for example. The lower side band components 74 are all recorded on the magnetic medium and have a smaller amplitude. The upper side band components are restricted by the highest frequency that can be recorded, so that only a portion 75 thereof is recorded.

Figure 3:
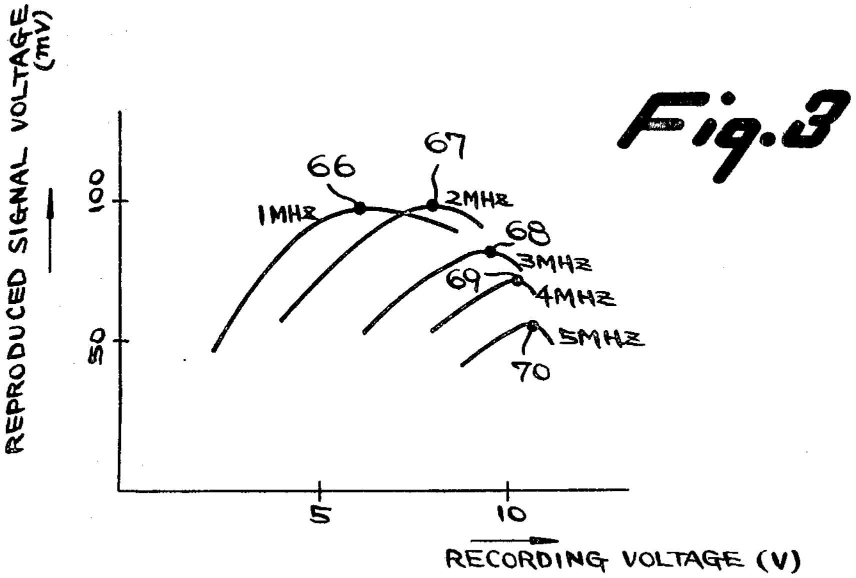
FIG. 3 is a graph of the output voltage versus recording voltage function at five recording frequencies for the video tape recorder of FIG. 1.

Generally, when a high frequency signal is recorded on and reproduced from magnetic medium, there are maximum reproduction or output signal levels which can be attained from a given range of recording voltages. As illustrated in FIG. 3, where the output signal levels are graphed as a function of recording voltage for 1 to 5 MHz. signals, maximum output signal levels are achieved with recording voltage associated with maxima ranging from 66 to 70. Any increase in the recording voltage from that which produces the maximum output signal level can only cause the output signal level to decrease.

Figure 7:
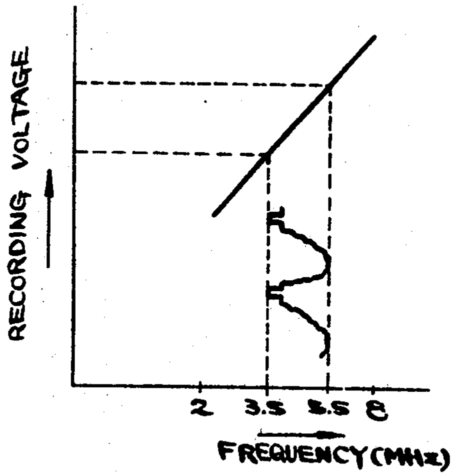
FIG. 7 is a graph of the recording voltage versus frequency for the video tape recorder of FIG. 1.

Normally the recording voltages of the frequency-deviated carrier components in the frequency-modulated signal are chosen to maximize output signal level by means of a filter (not shown), which has recording voltage versus frequency characteristics such as those shown in FIG. 7, since the frequency-deviated carrier components have the greater amplitudes. In FIG. 7, the point 3.5 MHz. represents the carrier frequency corresponding to the black level or peak of the synchronization pulse, and the point 5.5 MHz. represents the carrier frequency corresponding to the white level.

As described in our aforementioned application, Ser. No. 614,933, filed Feb. 9, 1967, now U.S. Pat. No. 3,506,793, in order to minimize the effect of the beat signal, the recording level for the new signal is in the range between 1 to 6 decibels higher than the normal recording level. During the time while the new signal is being recorded over the old signal, the higher level is used for obtaining the maximum output signal level.

However, because points 66 to 70 (FIG. 3) represent maxima, any increases in the prior art recording voltage cause the corresponding output signal level to decrease. On the other hand, in recording and reproducing a wide band signal, a small modulation index is generally selected for the frequency-modulated signal. Then, the side band components are smaller than the frequency components (73 in FIG. 5) of the frequency-deviated carrier wave. Accordingly, the side band components are recorded at a voltage level which is lower than the voltage level at which the reproduced output has a maximum value. Hence, the reproduced output level of the lower side band components is increased as the recording voltage is increased. However, the rage of increase of the reproduced output level of the lower frequency components is higher than that of the higher frequency components because of the high frequency loss of the magnetic heads and magnetic medium.

As aforementioned, an increase in recording voltage produces a reproduced output in which the carrier wave components of the frequency-modulated wave are reduced and the lower side band components are increased. As a result, the frequency-modulation index of the reproduced frequency-modulated wave becomes larger than that of the frequency-modulated wave to be recorded, making it impossible to reproduce signals at a high fidelity. Moreover, since the frequency of the lower of side band components of the frequency-modulated wave can be expressed by $f_1$-$f_2$ in which $f_1$ is the frequency of the carrier wave and $f_2$ is the frequency of the modulation signal, the lower frequency components in the lower side band correspond to the higher frequency components of the modulation signal. Because the rate of increase of the reproduced output level of the lower frequency components in the lower side band is higher than that of the higher frequency components as aforementioned, the higher frequency components of the video signal demodulated from the reproduced signal are more pronounced than the lower frequency components. As a result, an undesirable phenomenon is produced, such as an inversion of the reproduced images as aforementioned.

The frequency in the upper side band being high, any increase in the reproduced output level is suppressed by a marked increase in the high frequency loss of the magnetic heads and magnetic medium and the aforesaid frequency response of the filter, with a result that there is little change in the reproduced output.

Figure 6:
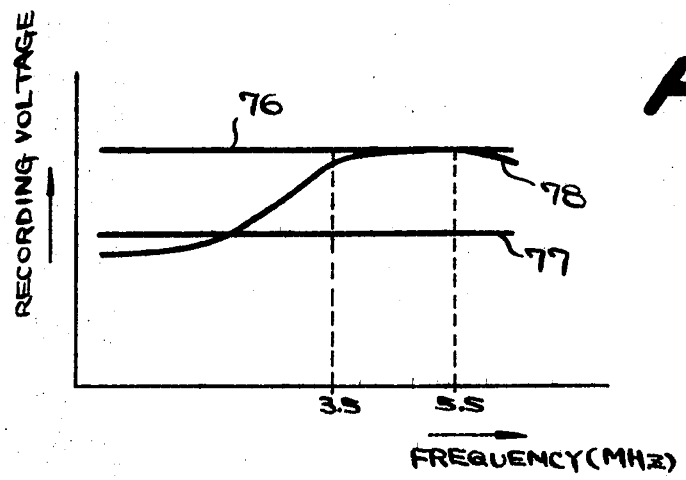
FIG. 6 are graphs of recording voltage versus frequency according to a prior art and this invention respectively.

A signal is recorded through an amplifier which has a uniform response to all the frequencies, as shown by the straight line 77 in FIG. 6, in a normal recording operation. A new signal is recorded by increasing the gain of the amplifier, as shown by the straight line 76, during a superimposed recording operation. The recorded video signal has a frequency spectrum shown by the curve 71 in FIG. 4 and will have a frequency spectrum shown by the curve 72 after being reproduced and demodulated.

According to the present invention, a new signal is recorded directly over an old signal previously recorded on a magnetic medium. The frequency components in the frequency band including the carrier and the upper side band are recorded at a signal level which is higher by a predetermined amount, than the normal signal level. The frequency components in the lower side band are first passed through an amplification system which has response characteristics such that the increased recording level is reduced from the predetermined increased level with a lowering of frequencies. The, the lower band is passed through an amplification system having a normal recording level, as shown by the curve 77 in FIG. 6, when the erased portion of the magnetic medium has reached the recording magnetic heads. A reproduced video signal can thus be provided which has the same modulation index as the recorded video signal or which is true to the recorded video signal. The upper side band components are passed through a filter so that only a part thereof is transmitted. Moreover, the upper side band frequencies have little change in the reproduced output because any increase in the reproduced output level thereof is suppressed as aforementioned. The upper side band frequencies thus exert little influence on the reproduced video signal.

Figure 8:
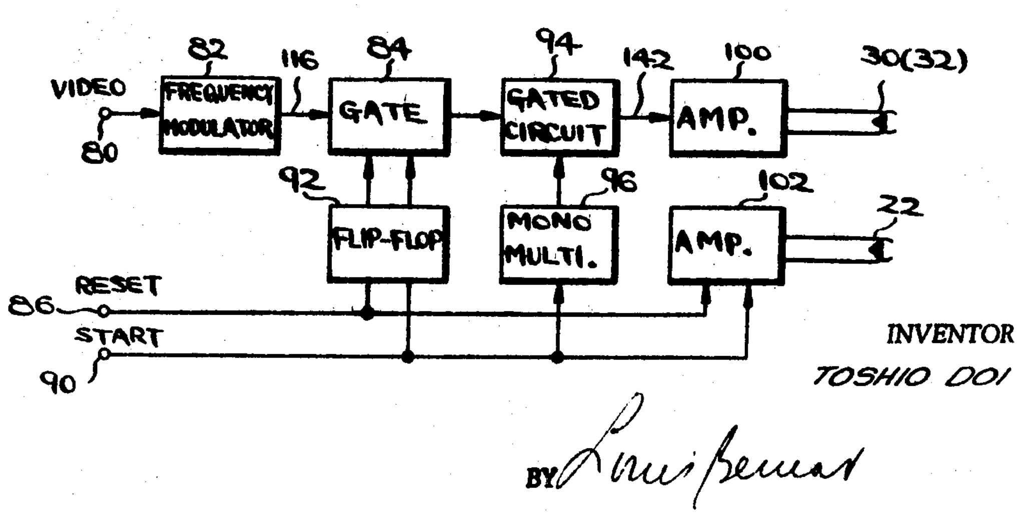
FIG. 8 is a block diagram of the circuitry of the editing system incorporated in the video tape recorder of FIG. 1.

A block diagram of the editing system for the video tape recorder of FIG. 1 is illustrated in FIG. 8. The video signal to be recorded is applied to an input terminal 80 of a frequency modulator 82. The FM output signal from the frequency modulator 82 is transmitted to a gate circuit 84. A reset pulse generated by a switch (not shown) when the end of the new signal segment is reached is applied to an input terminal 86. A start signal generated by a switch (not shown) at the beginning of the recording of the new signal segment is applied to an input terminal 90. The terminals 86 and 90 are connected to the inputs of a flip-flop 92 as shown.

When a start signal is applied to the flip-flop 92, it changes states thereby causing the gate circuit 84, which is connected to its output, to open so that video signals can be transmitted through to the input of a gated circuit 94.

The gated circuit 94 is a gating amplifier having two amplifying levels; one having a flat frequency response and chosen so that an optimum output signal level of carrier frequency components is achieved and the other chosen so that the amplifying level in the frequency ranges of the carrier and the upper side band is a predetermined value. Preferably, this other level is from 1 to 6 decibels higher than the first level, and the amplifying level in the frequency ranges of the lower side band is gradually decreased from the predetermined value toward the lower frequency, for reasons which have been described above. The gated circuit 94 is gated from one amplifying level to the other by signals from a monostable multivibrator 96. Upon receiving a start signal via terminal 90 multivibrator 96 switches from its resting state to another state and then back to its resting state. There is a delay time equal to the interval required for the double-recorded portion of the tape to pass beyond the recording heads 30 and 32.

The output signal of the gated circuit 94 is applied to an amplifier 100 which in turn transmits it to recording head 30 and 32 (here shown as one head).

A gate amplifier 102 provides the necessary high frequency bias signal for the erasing head 22 when it receives a start signal via the terminal 90. The bias signal is terminated when a reset signal is received via the terminal 86.

Figure 9:
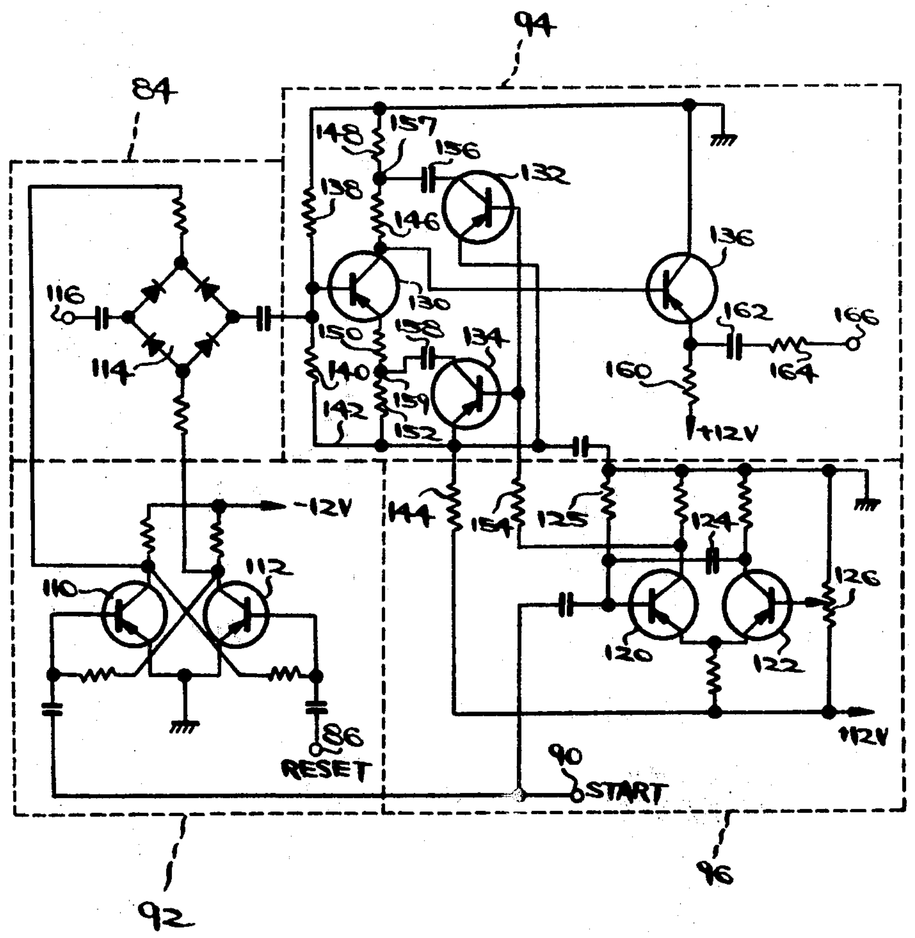
FIG. 9 is a schematic diagram of the circuit of the embodiment of the editing system incorporated in the video tape recorder of FIG. 1.

Referring to FIG. 9, the flip-flop circuit 92 is comprised of transistors 110 and 112. When a positive reset trigger pulse is applied to the terminal 86, the transistor 110 switches to its ON state, and the transistor 112 switches to its OFF state. The gate circuit 84, comprises a diode bridge 114, switched off because the diodes comprising the bridge are back-biased into their nonconducting states by the potential difference between the collectors of transistors 110 and 112. Thus, the video signal cannot be transmitted to the gated circuit 94.

A positive start pulse is generated by a switch (not shown) which is operated at the beginning of the recording period for the new signal. This pulse is applied to the base of the transistor 110. The transistor 110 switches OFF thereby causing transistor 112 to be switched ON.

The potential difference between the collectors of the transistors 110 and 112 changes polarity so that the gate circuit 84 opens, and the output signal from the frequency modulator 82, appearing at terminal 116, is transmitted through the gated circuit 84 to the gate circuit 94.

The monostable multivibrator 96 comprises transistors 120 and 122 connected in an emitter-coupled multivibrator configuration. The operation of this stage is known in conventional prior arts. The delay period required for the multivibrator 96 to switch back from its unstable binary state to its resting state is determined by the time constant of the network containing a capacitor 124 and a resistor 125, and by a position of the tap of a potentiometer 126. The potentiometer 126 is adjusted so that the delay period of the multivibrator 96 equals the interval required for a point on the tape to pass from the erasing head 22 to the last point of contact between the tape and the guide drum 26 near the guide roller 34. In this embodiment the delay period is 1.8 seconds.

When the start pulse is applied through the terminal 90 to the base of the transistor 120, that transistor switches to its OFF state, and its collector drops to ground potential.

The gated circuit 94 comprises transistors 130, 132, 134 and 136. The base of the transistor 130 is connected through a resistor 138 to ground and through a resistor 140 to a line 142 connected through a resistor 144 to +12V. line of a power source. The collector of the transistor 130 is connected to the base of the transistor 136 and through a series circuit of resistors 146 and 148 to ground. The emitter of the transistor 130 is connected through a series circuit of resistors 150 and 152 to the line 142. The bases of the transistors 132 and 134 are connected through a resistor 154 to the collector of the transistor 120, and the emitters of the transistors are connected to the line 142. The collector of the transistor 132 is connected through a capacitor 156 to the connecting point 157 between the resistors 146 and 148. The collector of the transistor 134 is connected through a capacitor 158 to the connecting point 159 between the resistors 150 and 152. The collector of the transistor 136 is connected to ground. The emitter of the transistor 136 is connected through a resistor 160 to the +12V., line and also through a series circuit of a capacitor 162 and a resistor 164 to an output terminal 166.

Here, the electrostatic capacity of the capacitor 156 is selected such that the capacitor has a sufficiently low impedance with respect to the frequency range of the lower side band of the frequency-modulated wave. On the other hand, the electrostatic capacity of the capacitor 158 is selected such that the impedance of the capacitor is sufficiently lower than the impedance with the resistors 152, with respect to the frequency range of the carrier wave and the frequency range higher than the carrier wave, is sufficiently higher than the impedance of this resistor, with respect to the lower frequencies of the lower side band.

When a start pulse is applied to the terminal 90, the transistor 120 switches to its OFF state, and its collector electrode is switched to ground potential. Therefore, the base potential of the transistors 132 and 134 is decreased to a level which is lower than their emitter potential, and the transistors 132 and 134 are gated into its ON STATE. When the transistor 132 is in the ON state, the connecting point 157 is connected to the line 142 through the capacitor 156. The resistor 148 is virtually shunted by the capacitor 156. When the transistor 134 is in the ON state, the connecting point 159 is connected to the line 142 through the capacitor 158. The resistor 152 is virtually shunted by the capacitor 158. When the monostable multivibrator 96 returns to its resting state, the transistor 120 switches to its ON state, and its collector potential is so high that the base potential of the transistors 132 and 134 is higher than their emitter potential. Thus, the transistors 132 and 134 are gated to their OFF state and the above described shunting effect is removed.

When the transistors 132 and 134 are in the ON state, the resistor 148 which forms a part of the collector load of the transistor 130 is shunted by the capacitor 156, which has a sufficiently large electrostatic capacity, as stated previously. The resistor 152 forms a part of the emitter load of the transistor 130 and is shunted by the capacitor 158 having an electrostatic capacity of the magnitude as stated previously. Thus, the amount of negative feedback reduced in the amplification stage including the transistor 130 is determined in terms of frequency by the parallel impedance of the value of resistance of the resistor 152 and the value of capacitance of the capacitor 158.

Assume that the values of resistance of the resistors 148, 146, 150 and 152 are $R_1$, $R_2$, $R_3$ and $R_4$ respectively and that the voltage gain of the aforesaid amplification stage has a uniform value of G through the entire frequency range in which the frequency-modulated wave is transmitted. Then, when the transistors 132 and 134 are in the ON state, the voltage gain of the aforesaid amplification stage in the frequency range of the carrier wave and the upper side band will substantially be as follows:

$$(R_3+R_4)/R_3 \times R_2/(R_1+R_2) \times G$$

The voltage gain in the lower frequency range of the lower side band will be as follows:

$$R_2/(R_1+R_2) \times G$$

Therefore, if the values of resistance $R_1$, $R_2$, $R_3$ and $R_4$ are suitably selected and the values of the electrostatic capacity of the capacitors 156 and 158 are also suitably selected, then it is possible to provide an amplification circuit having a frequency response as shown by the curve 78 in FIG. 6.

The frequency-modulated signal appearing at the collector of the transistor 130 is transmitted through a buffer amplifier containing a transistor 136 and appears at an output terminal 166.

In this manner, the carrier wave and the upper side band components of the new signal to be recorded over an existing signal are amplified to a predetermined higher than normal recording level. The recording level of the lower side band components is gradually decreased from the predetermined level with a lowering frequency for a period during which there is a double recording at the beginning of the new signal segment, here 1.8 seconds commencing with the receipt of the start pulse.

The appearance of a start pulse on terminal 90 causes the flip-flop circuit 92 and the monostable multivibrator circuit 96 to change states almost instantaneously. Because the circuit 96 is monostable, it returns to its resting state at the end of the desired delay period. The flip-flop circuit 92, however, will not return to its original state until it receives a reset pulse at the end of the newly recorded segment on the terminal 86.

According to the requirement of the application, the flip-flop circuit 92 can be made to reset instantaneously; or, it can be made to reset after a period of delay commencing with the receipt of the reset pulse. Editing marks caused by erased and unrecorded portions of the tape at the end of newly recorded segments are eliminated, as described more fully in our copending application, Ser. No. 594,760, filed Nov. 16, 1966 and now abandoned. In this manner the erasing head can be deenergized before the recording head is deenergized.

The modification of the illustrated embodiment are practical for use in other types of video recorders and in recorders used for storing other types of information on magnetic tape as well as other storage mediums. Accordingly, the scope of the invention should be determined from the following claims.

What is claimed is:

1. A signal editing system for recording a second signal on a moving magnetic storage medium having a first signal already recorded thereon, said medium being in an information recorder containing an erasing head located at a first position for erasing information recorded on the storage medium and a recording head located at a second position for recording information on the storage medium, said second position being downstream in the movement of said medium from said first position, said first and second signals being frequency-modulated signals in which a carrier wave is frequency-modulated with first and second wide band signals respectively, the editing system comprising means for controlling the energization of the erasing head to erase the first signal, means for energizing the recording head for applying said second signal to the recording head, means for amplifying the carrier wave components and the upper side band components of the second signal to have a predetermined higher than normal signal level, means for amplifying the lower side band components of the second signal at a level which is decreasingly lower than said predetermined level, means for operating said amplifier for lowering said lower side band components during a period commencing at approximately the time when the erasing head is energized, said period lasting for a time interval corresponding to the interval required for a point on the storage medium to move from said first position to said second position, and means for applying the second signal to the recording head at a normal signal level after said interval.

2. The editing system as claimed in claim 1 for a helical scan, magnetic tape recorder having a guide drum containing at least one of said recording heads and a tape guideway helically surrounding said drum wherein said period commences approximately at the time when the erasing head is energized and lasts for approximately the time interval required for a point on the storage medium to move from the proximity of the first position to the proximity of the guideway into the vicinity of the guide drum.

3. The editing system as claimed in claim 2 wherein the period commences at the same time that the erasing head is energized.

4. The editing system as claimed in claim 2 comprising in addition:

means for deenergizing the recording head, means for measuring another interval commencing when the erasing head is deenergized and ending after a period which equals the time required for a point on the magnetic medium to move from the proximity of the first position to the proximity of the guideway out of the guide drum.

5. The editing system as claimed in claim 2 wherein the means for energizing the recording head comprise first control means comprising a flip-flop circuit, means associated with said control means for switching flip-flop into a first output state responsive to the receipt of a start signal indicating the beginning of a second signal segment to be recorded, means for thereafter switching the flip-flop into a second output state responsive to the receipt of a reset signal indicating the end of the second signal segment which has been recorded, second control means comprising a monostable multivibrator circuit, means for switching the multivibrator from a resting state to another state responsive to the receipt of the start signal, means responsive to the monostable characteristics of said multivibrator for returning the multivibrator to its resting state at the end of an automatically occurring interval, means effective during the interval while said multivibrator is in said other state for recording at least a portion of the second signal over a portion of the first signal previously recorded on the tape, means comprising a gated circuit containing means responsive to the multivibrator circuit when it is in its resting state for amplifying at a normal recording level the second signal to be recorded, means responsive to said multivibrator in said other state for amplifying the carrier wave components and the upper side band components of the second signal at a predetermined higher than normal recording level, means also responsive to said multivibrator in said other state for amplifying the lower side band components of said second signal at a level which is decreasingly lowered as a function of the lowering of frequencies in said lower side band, and means comprising a gate circuit containing means for transmitting a signal to be recorded to the gated circuit means when the flip-flop is in the first output state and for preventing the transmission of the signal to the gated circuit when the flip-flop is in the second state.

6. The editing system as defined in claim 5 wherein the means comprising the flip-flop circuit comprises in addition:

means for delaying the switching of the flip-flop into the second state for an interval commencing with the receipt of said reset pulse and lasting for a period which is equal to the time which is required for a point on the magnetic tape to travel from the erasing head to the last point at which the recording head can record a signal on the tape.

7. A signal editing system for recording a second signal on a moving magnetic storage medium whereon a first signal is already recorded in an information recorder containing an erasing head located at a first position for erasing information recorded on the storage medium and a recording head located at a second position for recording information on the storage medium, said first and second signals being frequency-modulated signals in which a carrier wave is frequency-modulated with first and second wide band signals respectively, the editing system comprising:

a. means for controlling the energization of the erasing head to erase the first signal;

b. means for energizing the recording head including means for applying to the recording head the carrier wave components and the upper side band components of the second signal at a predetermined higher than normal signal level and the lower side band components of the second signal at a level which is decreasingly lowered from said predetermined level with lowering of frequencies during a period commencing approximately at the same time as the time at which the erasing head is energized and lasting for a time interval required for a point on the storage medium to move from said first position to said second position, and means for applying the second signal to the recording head at a normal signal level after said period;

c. said information recorded further comprising a guide drum and a guideway for directing magnetic tape in a helical path around said drum, said guide drum containing recording heads wherein said period commences approximately at the same time as the time at which the erasing head is energized and lasts for approximately the same time interval as that required for a point on the storage medium to move from the proximity of the first position to the proximity of the way-in of the guide drum;

d. said means for energizing the recording head further comprising:
   1. a flip-flop circuit containing means for switching the flip-flop into a first output state upon the receipt of a start signal indicating the beginning of a second signal segment to be recorded and means for switching the flip-flop into a second output state upon the receipt of a reset signal indicating the end of the second signal segment which has been recorded;
   2. a monostable multivibrator circuit containing means for switching the multivibrator from a resting state to another state upon receipt of the start signal and means for returning the multivibrator to its resting state at the end of the interval during which a portion of the second signal segment is being recorded over a portion of a first signal segment already appearing on the tape;
   3. a gated circuit containing means for amplifying the second signal to be recorded to a normal recording level when the multivibrator circuit is in its resting state and for amplifying the carrier wave components and the upper side band components of the second signal at a predetermined higher than normal recording level, the lower side band components of said second signal at a level which is decreasingly lowered from said predetermined level with lowering of frequencies when the multivibrator circuit is in another state;
   4. a gate circuit containing means for transmitting a signal to be recorded to the gated circuit when the flip-flop is in the first output state and for preventing the transmission of the signal to the gated circuit when the flip-flop is in the second state; and in which said gated circuit comprises a first transistor including a base adapted to receive a signal to be recorded, a collector connected to one end of a plurality of load resistances connected in series, and an emitter connected to one end of a plurality of resistors connected in series; a second transistor including a collector connected through a first capacitor to an intermediate connecting point of said plurality of load resistances, and an emitter connected to the other end of said plurality of resistors; a third transistor including a collector connected through a second capacitor to an intermediate connecting point of said plurality of resistors, and an emitter connected to the other end of said plurality of resistors; and means for biasing in a reverse direction the voltage across the base and emitter of said second and third transistors when said monostable multivibrator is in the resting state and biasing in a normal direction the voltage across the base and emitter of said second and third transistors; the value of the electrostatic capacity of said first capacitor being selected such that it provides a sufficiently low impedance in the frequency range of the lower side band of said second signal, the value of the electrostatic capacity of said second capacitor being selected such that it provides a sufficiently lower impedance than the value of resistance between said other end of said plurality of resistors and said intermediate connecting point to which said second capacitor is connected with respect to the frequency range of the carrier wave and the upper side band of said second signal and provides a sufficiently higher impedance than said value of resistance with respect to the lower frequencies of the lower side band of the said second signal.